Patented Aug. 11, 1925.

1,549,465

UNITED STATES PATENT OFFICE.

PAUL GEORGE DOHR, OF YONKERS, NEW YORK, ASSIGNOR, BY MESNE ASSIGNMENTS, TO PHILIP A. KOBER, OF HASTINGS-ON-HUDSON, NEW YORK.

PROCESS OF MAKING NEO-ARSPHENAMINES.

No Drawing.   Application filed December 31, 1921.   Serial No. 526,295.

*To all whom it may concern:*

Be it known that I, PAUL GEORGE DOHR, a citizen of the United States, residing at Yonkers, in the county of Westchester and State of New York, have invented new and useful Improvements in Processes of Making Neo-Arsphenamines, of which the following is a specification.

This invention relates to a process of making neo-arsphenamine, a compound prepared from arsphenamine, (3, 3-diamino-4, 4-dihydroxy-1-arsenobenzene dihydrochloride) by means of formaldehyd-sulphoxylate ($HO-CH_2-O-S-O-Na$).

Arsphenamine, owing to its hydrochloric acid content requires neutralization before administration and the neo derivatives were prepared in order to eliminate this. But in practise the neo derivatives were found to contain less of the active principle, arsphenamine base, than the theory called for. As a matter of fact neoarsphenamines have only an arsenic content as the U. S. Public Health Service found, of 16 to 20%, whereas they should be 32.2% if pure and anhydrous. In the literature a number of methods of preparation are mentioned, but they all lead to a more or less impure product. Korndorfer and Reuter (U. S. P. 1,053,300. Reissue 13,848.) give in detail a number of methods of preparation and mention one or two other methods, but fail to specify details or other disclosures sufficient to make a pure product.

Thus in Example 1. (Korndorfer and Reuter) a solution of neoarsphenamine is made which must contain as impurities, sodium chloride, excess formaldehyde sulphoxylates and sodium sulphite, all resulting from the reaction of the constituents added. In examples 2 and 3 the precipitation of the complex with 100 cc. 12% hydrochloric acid gives a purer substance, but the filtration of this complex free from mother liquor is practically impossible, owing to its gelatinous nature, and more or less remains impure.

In examples 4 and 5 the product is also highly contaminated and no details were suggested for eliminating these impurities.

In the manufacture of pure neo-arsphenamines quick filtration and washing is essential as the reaction goes on as long as the reagents are in contact with the moist arsphenamine. The mother liquor always contains formaldehyde sulphoxylate if previous disclosures are followed and if made with the di-hydrochloride of arsphenamine base, must contain decomposition and reaction products of this reagent, sodium chloride, sodium sulphite, and if precipitated finally as disclosed, from alcohol, must contain alcohol of crystallization and also alcohol of combination, or in combination.

Now I have discovered that an excess of the reagent is not necessary and if properly used, the sulphinic acid complex will precipitate or crystallize out of aqueous solutions slowly, so that large particles or crystals are obtained, with the result that this complex can be filtered quickly, easily and on a large scale, and washed easily with hydrochloric acid and water, so that the sulphinic acid complex can be obtained chemically pure and therefore convertible into its sodium salt, the neo-arsphenamine, with high purity. By evaporating the neutralized complex in a high vacuum and avoiding the alcohol precipitation, the neo salt will contain 29.88% arsenic indicating two molecules of water of crystallization and after further drying may contain 30.99% indicating one molecule of water of crystallization, or even close to 32.19% the amount for the chemically pure and anhydrous. It may also be precipitated by acetone or another solvent that is inert under the conditions of the experiment and in the presence of this complex.

The principal parts of my discovery are that, by using a mono- or di-hydrochloride of the arsphenamine base and adding enough formaldehyde sulphoxylate to make a mono-sulphinic acid (1 mole) the neo base will slowly but steadily precipitate or crystallize as it is formed, easily filterable and washable. It must be understood that enough hydrochloric acid must be present at all times to keep the sodium salt of the complex from forming, otherwise it will not, of course, allow the complex to precipitate. Another important matter is the washing of the complex, after filtering, with dilute hydrochloric acid. This decomposes sulphites that may have been occluded in the precipitate and removes the products. In other words removes from the complex the unstable and catalytic substances.

I prefer to go about the preparation of a pure neo-arsphenamine as follows:

*Example 1.*—23.74 grams (mole/20) of arsphenamine (the dihydrochloride of the base allowing for two molecules of water of crystallization) are dissolved in 250 cc. of water and reduced to a temperature of 20° C. Then while stirring are added one mole of formaldehyde sulfoxylate (5.9 grams if pure dissolved in ten parts of water). Both the arsphenamine and the sulfoxylate solutions should be perfectly clear; if not they must be filtered until clear. Within five to ten minutes a precipitate begins to form, occasionally a gel is formed first, and within an hour the precipitation is complete. The liquor is then filtered off and the precipitate washed preferably with 2N/1 hydrochloride acid and finally with distilled water but it is to be understood that a weaker hydrochloric acid may be used, as I have found by experiment that the use of a weaker acid is entirely satisfactory. In these last operations, washing with water and in the following operations, air is to be excluded as much as possible, by operating in inclosed vessels or by the use of an inert gas. The moist complex base is then dissolved in sodium carbonate or sodium hydroxide solution, filtered and evaporated in a high vacuum with the aid of heat, or the clear solution of the neutralized complex is precipitated with ten volumes of acetone.

The neo-arsphenamine is left as a dark orange or brown amorphous substance when evaporated, as a yellow powder when precipitated with acetone. This powder dissolves slower in water than ordinary impure neo-arsphenamines as it has in common with pure arsphenamine a tendency to gelatinize. The arsenic content will vary depending on the efficiency of the washing, purity of reagents and the extent of drying, from 29.5% to 32.0%.

*Example 2.*—54.9 grams of arsphenamine base (3 mole/20) which previously has been washed with water at 60° C. to free it from impurities resulting from adherence of the mother liquor, are emulsified with a small quantity of water in order to obtain a uniform emulsion of the base, free from lumps. In other words like a thick cream. Then 2N/1 hydrochloric acid is added little by little until the base is dissolved. This amount of hydrochloric acid should be not more than one gram mole equivalent, so that in solution a mon-hydrochloride of the base results. In this example it would be 150 cc. of normal or 75 cc. of 2N/1 hydrochloric acid would be sufficient. This solution in turn is filtered clear to free it from insoluble matter. No precautions have to be taken to exclude air from these acid solutions as it has been found that contrary to the alkaline mixtures of Ehrlich's and Korndorfer-Reuter methods, the acid mixtures decompose or oxidize very slowly. To this solution is then added with stirring the equivalent of one mole (17.7 grams if pure) of formaldehyde sulfoxylate dissolved in ten parts of water, when a light yellow precipitate is formed, which is the arsphenamine base due to the neutralization of the hydrochloric acid of the base by the sodium of the formaldehyde sulfoxylate. This precipitate is redissolved by adding with stirring, 75 cc. of 2N/1 hydrochloric acid, which undoubtedly redissolves the base as a monhydrate. This solution should be perfectly clear at the start, but on standing 5 to 10 minutes the precipitation of the neo-complex begins and is finished within an hour.

This complex base is then washed with hydrochloric acid, water, and further treated as in Example 1.

I claim:—

1. The process of making neo-arsphenamine which consists in having the formaldehyde sulfoxylate to act on arsphenamine in an acid solution sufficiently strong to precipitate the neo-complex as it is formed, filtering and washing the complex and converting it into a sodium salt, substantially as described.

2. The process of making neo-arsphenamine which consists in having formaldehyde sulfoxylate to act on arsphenamine base in an acid solution sufficiently strong to precipitate the neo-complex as it is formed, removing the mother liquor and impurities and converting it into a sodium salt.

3. The process of making neo-arsphenamine which consists in having formaldehyde sulfoxylate to act on arsphenamine base in an acid solution sufficiently strong to precipitate the neo-complex as it is formed, removing impurities by washing with aqueous hydrochloric acid and water and converting it into a sodium salt.

4. The process of making neo-arsphenamine which consists in having formaldehyde sulfoxylate to act on arsphenamine in an acid solution sufficiently strong to precipitate the neo-complex as it is formed, removing impurities, and dissolving in alkali and obtaining the dry sodium salt by evaporation.

PAUL GEORGE DOHR.